July 2, 1935.  L. C. DICKSON  2,007,039
BASKET CARRIER
Filed Jan. 24, 1934
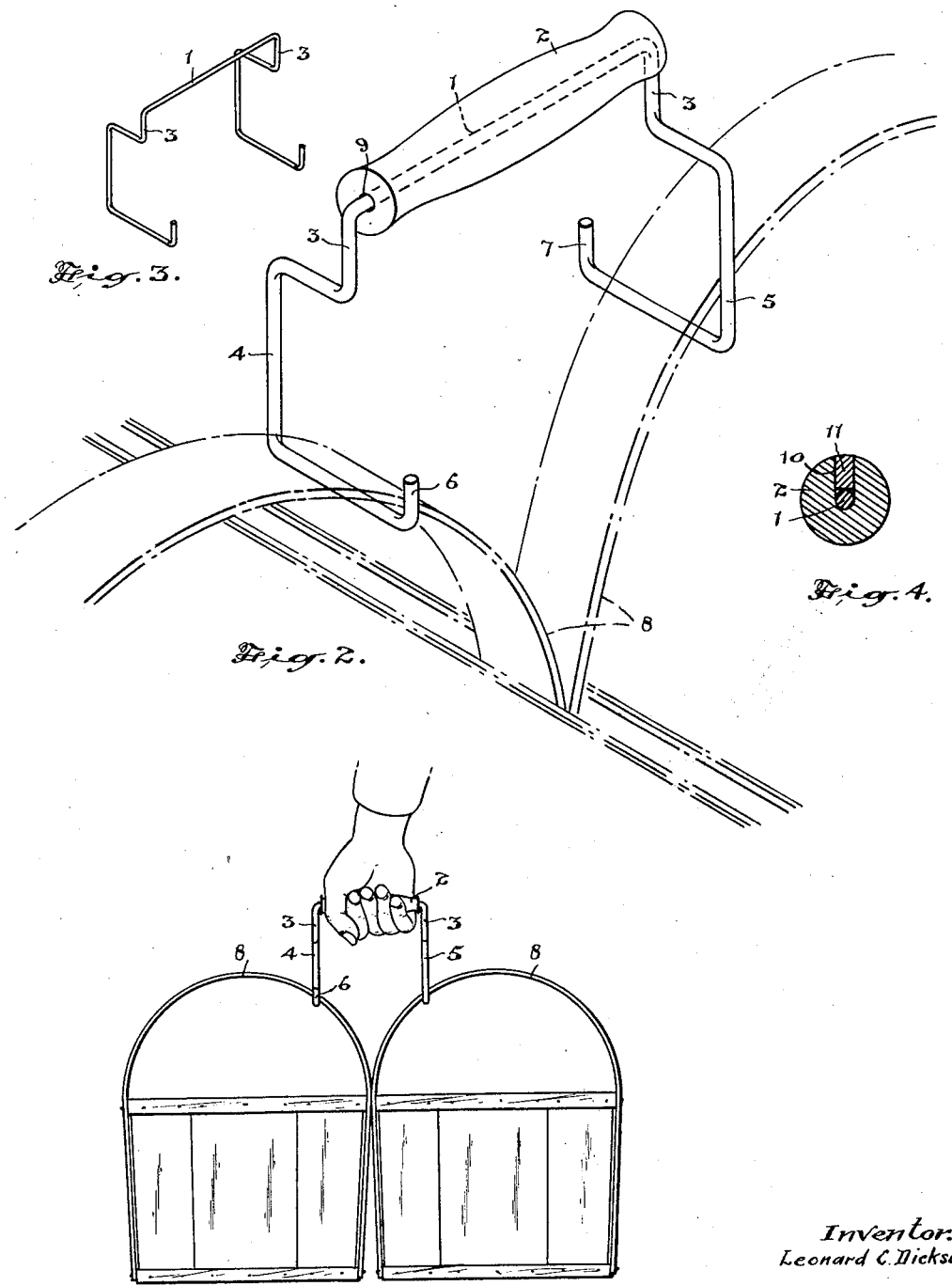
Inventor:
Leonard C. Dickson Patented July 2, 1935

2,007,039

UNITED STATES PATENT OFFICE 2,007,039

BASKET CARRIER

Leonard C. Dickson, Swansea, Ontario, Canada

Application January 24, 1934, Serial No. 708,066
In Canada December 30, 1933

4 Claims. (Cl. 224—45)

The principal objects of the invention are, to facilitate the work in the handling of baskets containing fruit, vegetables and other materials, providing a device which will enable the handling of baskets in pairs without undue stress or discomfort.

A further object is to provide a simple and very effective form of holder which will grasp two baskets at once and will hold them securely together while being handled.

A still further object is to provide a device of this nature which may be manufactured at very low cost.

The principal feature of the invention consists in the novel construction of a looped wire handle providing a pair of laterally arranged spaced hook members adapted to engage and hold a pair of basket handles with the baskets in paired arrangement.

In the accompanying drawing, Figure 1 is an elevational view showing the application of this invention in the holding of a pair of baskets.

Figure 2 is a full sized detail view of the carrier device showing in dotted lines a portion of a pair of basket handles engaging same.

Figure 3 is a small perspective view illustrating a slightly modified construction of the holder loop.

Figure 4 is a cross sectional view of a handle showing one method of securing the handle on the wire.

In the handling of baskets of the type which are commonly used for packaging fruits and vegetables, that is, the type having centrally arranged body handles formed of a flat strip of wood, it is usual for the persons handling these baskets to grasp two at a time, but the divergently spreading wide handles are extremely hard upon the hands, both in respect to the surface contact and the stretching of the muscles of the fingers apart to grasp the spreading handles.

The present invention comprises a length of heavy steel wire, which is formed with a central loop 1 upon which a suitable handle 2 is mounted. The right angularly turned ends 3 of the loop 1 are bent to form a pair of rectangularly shaped loops 4 and 5 which terminate in the short upturned ends 6 and 7 respectively.

The loops 4 and 5 are open at one side so that they may be easily slipped under the body handles 8 of the baskets.

The open sides of the rectangular loops are preferably arranged in opposed relation so that one loop is open to receive a handle from one side and the other loop is open to receive a handle from the other side. This permits the very easy application of the carrier to the paired baskets which are placed together in rows or piles and by simply placing the carrier between a pair of handles and then turning it with a twist of the wrist the two hooks will be made to engage the adjacent pairs of handles and the flat wood handle members rest between the closed sides of the hooks and the upturned ends.

The carrier is then lifted by means of the central handle and the baskets are held securely thereby to be lifted and carried and placed in another position and when the baskets are placed in another position it is merely necessary to drop the handle slightly and by turning the wrist disengage both hooks at once.

In the form shown in Figure 3 the open sides of the hooks are arranged at one side of the main handle loop.

The carrier when thus constructed will be manipulated in a slightly different manner, but the vertical loops will receive and hold the handles of the baskets in a precisely similar manner to that already described. The handle or grip portions 2 mounted on the central loops of the carriers may be bored with a longitudinal hole 9 and threaded on to the length of wire before the end loops are formed or the grip may be made with a longitudinal slot 10 as shown in Figure 4, which may be slipped on to the wire loop and the slot then closed by the insertion of a strip 11 which may be glued or otherwise fastened in position after the wire has been inserted.

A carrier such as described made from heavy steel wire will carry a pair fo baskets containing any of the usual produce without being deformed and a person equipped with a pair of such carriers may handle with ease a very much increased quantity of goods in a given time in shifting the baskets from place to place. The carriers will also be convenient for fruit pickers or other persons who may require to carry one or more baskets about with them.

What I claim as my invention is:—

1. A carrier for baskets of the type having arched handles of flat cross section comprising a handle, and a pair of hooks arranged one at each end of said handle and turned transversely, said hooks presenting substantially straight bottom sections for extended pressure contact with the flat under surface of the handles of a pair of baskets arranged side-by-side.

2. A basket carrier comprising a handle, a length of wire extending through said handle having its ends bent into transverse loops open at one side, said loops being characterized by being each of squared formation with the bottom disposed substantially horizontal in a common plane for balanced surface engagement with the flat under surface of bracket handles of the arched type.

3. A carrier for baskets of the type having arched handles of flat cross section comprising a handle, a length of wire extending through said handle and bent downward at right angles at the ends of said handle, the right angularly bent portions having portions bent horizontally, downward and horizontally respectively in a progressive manner into mating squared formations with the horizontally arranged portions forming the bottoms to receive the basket handles in broad surface contact with the flat underside thereof, the end extremities of the horizontal bottoms being terminated as short upturned lugs for engagement with the edges of the basket handles.

4. A carrier for baskets of the type having arched handles of flat cross section comprising a length of wire having a handle portion intermediate of its length, the respective end portions of said length of wire beyond the handle portion being bent in reverse directions in planes intersecting the axis of the handle portion and presenting straight substantially parallel bottom portions for balanced engagement with the flat underside of the handles of a pair of baskets arranged side-by-side.

LEONARD C. DICKSON.